(12) United States Patent
Faust et al.

(10) Patent No.: US 9,771,442 B2
(45) Date of Patent: *Sep. 26, 2017

(54) POLYMERIZATION INITIATING SYSTEM AND METHOD TO PRODUCE HIGHLY REACTIVE OLEFIN FUNCTIONAL POLYMERS

(71) Applicants: University of Massachusetts, Boston, MA (US); Infineum International Limited, Abingdon, Oxfordshire (GB)

(72) Inventors: Rudolf Faust, Lexington, MA (US); Jacob Emert, Linden, NJ (US)

(73) Assignees: University of Massachusetts, Boston, MA (US); Infineum International Limited, Abingdon, Oxfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/710,763

(22) Filed: May 13, 2015

(65) Prior Publication Data

US 2016/0333123 A1 Nov. 17, 2016

(51) Int. Cl.
*C08F 110/10* (2006.01)
*C08F 4/14* (2006.01)

(52) U.S. Cl.
CPC .............. *C08F 110/10* (2013.01); *C08F 4/14* (2013.01)

(58) Field of Classification Search
CPC ................................. C08F 4/26; C08F 110/10
USPC ........................................................ 524/836
See application file for complete search history.

(56) References Cited

U.S. PATENT DOCUMENTS

| | | |
|---|---|---|
| 2,682,531 A | 6/1954 | Ernst et al. |
| 3,846,392 A | 11/1974 | Matsumura et al. |
| 3,850,897 A | 11/1974 | Priola et al. |
| 5,254,649 A | 10/1993 | Miln et al. |
| 5,408,018 A | 4/1995 | Rath |
| 5,663,470 A | 9/1997 | Chen et al. |
| 5,710,225 A | 1/1998 | Johnson et al. |
| 5,789,335 A | 8/1998 | Chen et al. |
| 6,211,312 B1 | 4/2001 | Holtcamp |
| 6,346,585 B1 | 2/2002 | Johnson et al. |
| 6,407,170 B1 | 6/2002 | Johnson et al. |
| 6,407,186 B1 | 6/2002 | Rath et al. |
| 6,441,110 B1 | 8/2002 | Sigwart et al. |
| 6,562,913 B1 | 5/2003 | Baxter, Jr. et al. |
| 6,683,138 B2 | 1/2004 | Baxter, Jr. et al. |
| 6,753,389 B1 | 6/2004 | Rath et al. |
| 6,846,903 B2 | 1/2005 | Wettling et al. |
| 6,939,943 B2 | 9/2005 | Wettling et al. |
| 7,038,008 B2 | 5/2006 | Wettling et al. |
| 7,217,773 B2 | 5/2007 | Rath et al. |
| 7,291,758 B2 | 11/2007 | Bohnenpoll et al. |
| 7,683,194 B2 | 3/2010 | Krossing et al. |
| 8,349,977 B2 | 1/2013 | Koenig et al. |
| 8,637,619 B2 | 1/2014 | Koenig et al. |
| 8,697,820 B2 | 4/2014 | Koenig et al. |
| 9,034,998 B2 | 5/2015 | Faust et al. |
| 9,156,294 B2 | 10/2015 | Kitawaki et al. |
| 9,156,924 B2* | 10/2015 | Faust ........................ C08F 4/26 |
| 9,631,038 B2 | 4/2017 | Faust et al. |
| 2004/0059076 A1 | 3/2004 | Webb et al. |
| 2008/0293900 A1 | 11/2008 | Hanefeld et al. |
| 2009/0318624 A1 | 12/2009 | Storey et al. |
| 2011/0201772 A1 | 8/2011 | Koenig et al. |
| 2012/0165473 A1* | 6/2012 | Koenig ..................... C08F 8/14 525/301 |
| 2013/0158217 A1* | 6/2013 | Faust .................... C08F 110/10 526/192 |
| 2014/0275453 A1 | 9/2014 | Emert et al. |
| 2015/0105525 A1* | 4/2015 | Faust ....................... C08F 4/52 526/172 |

FOREIGN PATENT DOCUMENTS

| | | |
|---|---|---|
| CN | 1753918 A | 3/2006 |
| CN | 101613423 B | 12/2009 |
| CN | 101955558 | 1/2011 |
| CN | 102007149 A | 4/2011 |
| CN | 102046671 A | 5/2011 |
| CN | 102137875 A | 7/2011 |
| EP | 0 436 775 | 7/1991 |
| EP | 0 489 508 | 6/1992 |
| EP | 2 604 635 | 6/2013 |
| JP | 3-203917 B2 | 6/1995 |

(Continued)

OTHER PUBLICATIONS

Final Office Action for U.S. Appl. No. 14/052,490, dated Sep. 28, 2015.
Chinese Office Action and Search Report for Patent Application 2014100878340 dated Dec. 3, 2015, "Polymerization Initiating System and Method to Produce Highly Reactive Olefin Functional Polymers,".
Japanese Office Action for Patent Application 20144547502 dated Feb. 19, 2016, "Polymerization Initiating System and Method to Produce Highly Reactive Olefin Functional Polymers,".
Office Action for U.S. Appl. No. 14/052,490, dated Mar. 31, 2016.
European Search Report for European Application No. 11194680.2-1301, entitled: "Polymerization Initiating System and Method to Produce Highly Reactive Olefin Functional Polymers," Dated: Mar. 22, 2013.

(Continued)

*Primary Examiner* — Ling Choi
*Assistant Examiner* — Ronald Grinsted
(74) *Attorney, Agent, or Firm* — Hamilton, Brook, Smith & Reynolds, P.C.

(57) ABSTRACT

A method for producing highly reactive olefin polymers wherein at least 50 mol % of the polymer chains have terminal double bonds, and a novel polymerization initiating system for accomplishing the same includes contacting isobutene or an isobutene-containing monomer mixture, wherein a Lewis acid catalyst is complexed with an oxygen and/or sulfur-containing Lewis base, in an apolar solvent, and wherein an initiator is employed to initiate polymerization of the isobutene or isobutene-containing monomer mixture.

31 Claims, No Drawings

(56) References Cited

FOREIGN PATENT DOCUMENTS

| JP | 48-60784 | 1/2012 |
|---|---|---|
| WO | WO 94/19380 | 9/1994 |
| WO | WO 99/07753 | 2/1999 |
| WO | WO 02/48216 A2 | 6/2002 |
| WO | WO 2004/014968 A2 | 2/2004 |
| WO | WO 2004/058828 | 7/2004 |
| WO | WO 2006/074211 | 7/2006 |
| WO | WO 2008/095933 | 8/2008 |
| WO | WO 2009/120551 | 10/2009 |
| WO | WO 2010/008890 A2 | 1/2010 |
| WO | WO 2010/139684 | 12/2010 |
| WO | WO 2011/054785 | 5/2011 |
| WO | WO 2013/021058 A1 | 2/2013 |
| WO | WO 2013/090764 | 6/2013 |

OTHER PUBLICATIONS

European Search Report for European Application No. 14157689.2, entitled: "Polymerization Initiating System and Method to Produce Highly Reactive Olefin Functional Polymers," Dated: May 15, 2014.
Final Office Action for U.S. Appl. No. 13/328,569; Date Mailed: Jan. 3, 2014.
International Preliminary Report on Patentability for PCTUS2012/069822, entitled: "Polymerization Initiating System and Method to Produce Highly Reactive Olefin Functional Polymers," Dated: Jun. 29, 2014.
International Search Report and Written Opinion for Int'l Appl. No. PCT/US2012/069822, entitled: "Polymerization Initiating System and Method to Produce Highly Reactive Olefin Functional Polymers," Date of Mailing: Mar. 22, 2013.
Kennedy et al., "New Telechelic Polymers and Sequential Copolymers by Polyfunctional Initiator-Transfer Agents (Inifers)," *Polymer Bulletin* (1), pp. 575-580 (1979).
Liu et al., "A cost-effective process for highly reactive polyisobutylenes via cationic polymerization coinitiated by AlCl3," *Polymer* (51), pp. 5960-5969 (2010).
Morgan et al., "Sulfonium Ton Adducts from Quasiliving Polyisobutylene and Mono- or Disulfides," *Macromolecules* (42), pp. 2344-2352 (2009).
Nielsen et al., "Synthesis of Isobutenyl-telechelic polyisobutylene by functionalization with isobutenyltrimethylsilane," *Polymer* (38)(No. 10), pp. 2529-2534 (1997).
Non-Final Office Action for U.S. Appl. No. 13/328,569; Date Mailed: Jul. 9, 2014.
Non-Final Office Action for U.S. Appl. No. 13/796,405, dated Aug. 21, 2014.
Non-Final Office Action for U.S. Appl. No. 14/052,490, dated Feb. 13, 2015.
Non-Final Office Action for U.S. Appl. No. 13/328,569; Date Mailed: Jan. 18, 2013.
Non-Final Office Action for U.S. Appl. No. 13/328,569; Date Mailed: Mar. 20, 2013.
Non-Final Office Action for U.S. Appl. No. 13/796,405; Date Mailed: Jan. 30, 2014.
Notice of Allowance for U.S. Appl. No. 13/328,569; Date Mailed: Jan. 30, 2015.
Shiman, D.I. et al., "Cationic Polymerization of Isobutylene by AlCl3/ether Complexes in Non-Polar Solvents: Effect of Ether Structure on the Selectivity of β-H Elimination," Polymer, 54: 2235-2242 (2013).
Simison et al., "End-Quenching of Quasiliving Carbocationic Isobutylene Polymerization with Hindered Bases: Quantitative Formation of exo-Olefin-Terminated Polyisobutylene," *Macromolecules* (39), pp. 2481-2487 (2006).
Vasilenko et al., "Cationic Polymerization of Isobutylene Using AlCl3Bu2 as a Coinitiator: Synthesis of Highly Reactive Polyisobutylene," *Macromolecules* (43), pp. 5503-5507 (2010).
European Search Report for European Application No. 14187668.0, entitled: "Polymerization Initiating System and Method to Produce Highly Reactive Olefin Functional Polymers," Dated: Feb. 25, 2015.
Notice of Allowance mailed Jul. 7, 2015 for U.S. Appl. No. 13/796,405; entitled "Polymerization Initiating System and Method to Produce Highly Reactive Olefin Functional Polymers".
Chinese Office Action for Patent Application 2014105327556 Filed Oct. 10, 2014, "Polymerization Initiating System and Method to Produce Highly Reactive Olefin Functional Polymers," dated Jun. 28, 2016.
Notice of Allowance mailed Aug. 31, 2016 for U.S. Appl. No. 14/052,490 entitled "Polymerization Initiating System and Method to Produce Highly Reactive Olefin Functional Polymers".
Chinese Office Action and Search Report for Patent Application 201280069469.X dated Oct. 10, 2015, "Polymerization Initiating System and Method to Produce Highly Reactive Olefin Functional Polymers,".
Bartelson, K.J., et al., "Cationic Polymerization of Isobutylene by FeCl3/Ether Complexes in Hexanes: An Investigation of the Steric and Electronic Effects of Ethers," Polymer, 54(18): 4858-4863 (Jul. 2013).
European Search Report for EP Application No. 16165673.1; entitled "Polymerization Initiating System and Method to Produce Highly Reactive Olefin Functional Polymers," Date Mailed: Oct. 27, 2016.
Kostjuk, S.V., "Recent Progress in the Lewis Acid Co-Initiated Cationic Polymerization of Isobutylene and 1,3-dienes," Royal Society of Chemistry, 5(17): 13125-13144 (Jan. 2015).
Kumar, R., et al., "Synthesis of Highly Reactive Polyisobutylene With FeCl3/Ether Complexes in Hexane; Kinetic and Mechanistic Studies," Polymer Chemistry, 6(2): 322-329 (Jan. 2015).
Notice of Allowance mailed Dec. 22, 2016 for U.S. Appl. No. 14/052,490 entitled "Polymerization Initiating System and Method to Produce Highly Reactive Olefin Functional Polymers".
Chinese Office Action for Patent Application 2014105327556 Filed Oct. 10, 2014, "Polymerization Initiating System and Method to Produce Highly Reactive Olefin Functional Polymers," dated Mar. 2, 2017.

* cited by examiner

POLYMERIZATION INITIATING SYSTEM AND METHOD TO PRODUCE HIGHLY REACTIVE OLEFIN FUNCTIONAL POLYMERS

The invention is directed to a method for producing highly reactive olefin polymers wherein at least 50 mol. % of the polymer chains have terminal double bonds, and a novel polymerization initiating system for accomplishing same.

BACKGROUND OF THE INVENTION

The carbocationic polymerization of isobutylene (IB) is the subject of great scientific and industrial interest. The unique properties of polyisobutylene (PIB), a chemically stable fully saturated polymer make it a desirable material with applications ranging from medical devices to ashless (metal-free) dispersants/detergents suitable for use as motor oil and fuel additives. These ashless dispersants/detergents can be characterized as oil soluble surfactants with oligoamine end-groups derived from low molecular weight (number average molecular weight ($\overline{M}_n$) of from about 500 to about 5000) PIB or polybutenes (copolymers of IB with $C_4$ olefins) having olefinic end groups.

Two major industrial methods have been developed to produce low molecular weight IB homo or copolymers with olefinic end groups. The "conventional" method uses a $C_4$ mixture and an aluminum halide based catalyst system and produces polybutenes with high tri-substituted olefinic contents. Due to the low reactivity of the tri-substituted olefinic end groups, polybutenes need to be chlorinated to react with maleic anhydride to give polybutenylsuccinic anhydride, which is subsequently reacted with oligoalkylenimines to yield polybutenylsuccinimide-type ashless dispersant/detergent. The other method employs a pure IB feed stream and a $BF_3$ complex-based catalyst with either alcohols, or ethers in a polymerization reaction run at low temperature, which yields highly reactive PIB (HR PIB) with high exo-olefinic end-group contents. In contrast to the tri-substituted olefins of conventional polybutenes, PIB exo-olefins readily react with maleic anhydride in a thermal "ene" reaction to produce PIB succinic anhydride and subsequently polyisobutenylsuccinimide ashless dispersants. Because the final product does not contain chlorine, HR PIB is more desirable than conventional polybutenes. However, $BF_3$ is difficult to handle and the polymer may contain fluorine. Further, as noted above, this method requires a pure IB feed steam and low temperature (e.g., $-30°$ C.) and therefore results in a more expensive product.

The above-described commercial process for producing HR PIB has been reported by U.S. Pat. No. 5,408,018 (and DE-A 2702604) to Rath. A range of process enhancements were subsequently reported in. U.S. Pat. Nos. 6,407,186, 6,753,389, and 7,217,773 to Rath et al. and U.S. Pat. Nos. 6,846,903, 6,939,943 and 7,038,008 to Wettling et al. A modified process using a different temperature regime and a low residence time was also previously described (e.g., U.S. Pat. Nos. 6,562,913 and 6,683,138 to Baxter et al.). All of these disclosures describe polymerizations carried out with $BF_3$ catalyst and an alcohol or ether co-catalyst. Such catalytic processes can leave residual fluorine in the polymer especially when utilized with the commonly available mixed $C_4$ Raffinate I stream. The presence of even small amounts of fluorine can cause problems in downstream functionalization reactors due to the release of HF, requiring the use of expensive fluorine removal post-treatment.

Many attempts have therefore been made to find other methods for producing HR PIB. For instance PIB with nearly quantitative exo-olefin end groups has been obtained by reacting tert-chloride-terminated PIB (PIB—Cl) with strong bases such as potassium tert-butoxide and alkali ethoxides in refluxing tetrahydrofuran (THF) for 20-24 h, (Kennedy, J. P.; Chang, V. S. C.; Smith, R. A.; Ivan, B. *Polym. Bull.* 1979, 1, 575); quenching living PIB with methallyltrimethylsilane, (Nielsen, L. V.; Nielson, R. R.; Gao, B.; Kops, J.; Ivan, B. *Polymer* 1997, 38, 2528.); quenching living PIB with a hindered base (e.g., 2,5-dimethylpyrrole or 1,2,2,6,6-pentamethylpiperidine), (Simison, K. L.; Stokes, C. D.; Harrison, J. J.; Storey, R. F. *Macromolecules* 2006, 39, 2481); quenching living PIB with an alkoxysilane or an ether compound (Storey, R. F.; Kemp, L. L. U.S. Patent Application Publication, 2009/0318624 A1, Dec. 24, 2009); and reacting living PIB with a mono-sulfide followed by decomposition of the resulting sulfonium salt with a base (Morgan. D. L.; Stokes, C. D.; Meierhoefer, M. A.; Storey, R. F. *Macromolecules* 2009, 42, 2344). However, all of the above methods are expensive as they involve living cationic polymerization at low temperature in a moderately polar solvent, and employ expensive reactants.

A broad disclosure of halogen-free metal catalysts based on oxides of Groups V and VI of the Periodic Table of Elements was described in U.S. Pat. No. 6,441,110 to Sigwart et al., but these catalysts were heterogeneous and gave poor monomer conversions, with only modest amounts of exo-olefins. Another catalyst system, based on metals from the 3rd to the 12th periods of the periodic system of elements with nitrile ligands and weakly coordinating anions was described in U.S. Pat. No. 7,291,758 to Bohnepoll et al. These catalysts were used only in a polar dichloromethane solution; not in an apolar, all-hydrocarbon media.

It has also been reported that $AlCl_3$—$OBu_2$ complexes in conjunction with a range of initiators or adventitious water initiate the polymerization of IB and in polar solvent ($CH_2Cl_2$/hexane 80/20 v/v) yield PIB with high exo-olefinic end groups up to 95% in a range of temperatures ($-60$ to $-20°$ C.) (Vasilenko, I. V.; Frolov, A. N.; Kostjuk, S. V. *Macromolecules* 2010, 43(13), 5503-5507). Independently, similar results were reported with adventitious water as initiator in conjunction with $AlCl_3$ or $FeCl_3$ dialkyl ether complexes in $CH_2Cl_2$ at temperatures ranging from $-20$ to $20°$ C. (Lui, Q.; Wu Y.; Zhang, Y.; Yan. P. F.; Xu, R. W. *Polymers* 2010, 51, 5960-5969). However, due to the need for the polar solvent $CH_2Cl_2$ the commercial potential of this method is questionable. $AlCl_3$—$OBu_2$ has been reported to produce PIB with terminal vinylidene bonds in the absence of solvent and without added initiator, or with water as an added initiator (USPG 2011/0201772A1 of König et al.). However, none of the conventional cationic initiators such as alkyl halides, ethers, esters, alcohols and Brønsted acids were found to initiate directly the polymerization in apolar media with $AlCl_3$. Therefore there remains a need for a robust and economic method for the preparation of highly reactive PIB or polybutene in a non-polar hydrocarbon media.

It was later found that conventional cationic initiators used in conjunction with certain combinations of Lewis acid/Lewis base complexes initiate the polymerization of IB in hydrocarbon solvents at temperatures of $-30°$ C. to $+50°$ C. and provide high yields of highly reactive PIB. More specifically, it was recognized that polymerization of IB in hydrocarbon solvents at temperatures of $-30°$ C. to $+50°$ C. could be initiated, and provide high yields of highly reactive PIB with a catalyst-initiator system comprising a Lewis acid catalyst (MR"Y$_n$) complexed to a Lewis base (B) in an apolar medium.

The affinity of the Lewis acid for the Lewis base was such that the Lewis acid can interact at least partially with a conventional cationic initiator (RX), enabling the formation of R$^+$, which initiated cationic polymerization of isobutylene. The initially complexed Lewis base was capable of effecting rapid deprotonation of the growing carbocation chain to form an exo-olefin prior to isomerization of the cationic chain or diffusion of the base into free solution. If the Lewis base did not complex to the Lewis acid, at least initially, deprotonation of the growing carbocation was not sufficiently rapid relative to isomerization to give the desired high yields of exo-olefin. If the interaction of the Lewis acid and the Lewis base was so strong that it prevented interaction with a conventional initiator, polymerization was be inefficient or did not occur at all. In the above systems, suitable Lewis bases were oxygen- and/or sulfur-containing nucleophiles, such as ethers, alcohols, ketones, aldehydes and esters, and sulfur-containing nucleophiles such as thioethers and thioketones.

More recently, it was noted that, while the above polymerization system provided excellent yields of highly reactive PIB, the yield could be further increased by selecting, as the Lewis base, a C$_1$ to C$_8$ dihydrocarbyl ether, wherein one or each of the hydrocarbyl groups of the dihydrocarbyl ether Lewis base is substituted with an electron-withdrawing group, such as a halogen atom (Kumar, R.; Zheng, B; Huang, K-W; Emert, J., Faust, R., Synthesis of Highly Reactive Polyisobutylene Catalyzed by EtAlCl$_2$/Bis(2-chloro-ethyl) Ether Soluble Complex in Hexanes, Macromolecules (2014), 47(6), 1959-1965; see also US PG Publication 2014/0275453).

It has now been found that with such complexed catalysts, H$_2$O, HCl and compounds of the formula ROH, wherein R is a hydrocarbyl group capable of forming a stable carbocation and wherein the carbon linking group R to the hydroxyl group is tertiary or benzylic also effectively initiate the polymerization of IB, and result in a PIB product having an exo olefin content substantially equivalent to that obtained with a tert-butyl chloride initiator, when the initiator (H$_2$O, HCl or ROH) is introduced into the reaction mixture separate from, and subsequent to, the introduction of the complexed catalyst.

SUMMARY OF THE INVENTION

The invention generally is directed to a process for the preparation of polybutene having an exo-olefin content of at least 50 mol. %, and to a catalyst-initiator, system for catalyzing the polymerization of isobutene or an isobutene-containing monomer mixture in a substantially or completely apolar solvent to provide a polybutene product having an exo-olefin content of at least 50 mol. %.

The process for the preparation of polybutene having an exo-olefin content of at least 50 mol. % includes contacting isobutene or an isobutene-containing monomer mixture, with a Lewis acid catalyst complexed with an oxygen and/or sulfur-containing Lewis base, in an apolar solvent, and initiating polymerization of said isobutene or an isobutene-containing monomer mixture with an initiator, wherein said Lewis acid catalyst is a Lewis acid of the formula MR"$_m$Y$_n$, wherein M is a metal selected from Al, Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether, wherein each ether hydrocarbyl group is independently selected from C$_1$ to C$_8$ hydrocarbyl, wherein one or each of said ether hydrocarbyl groups are substituted with an electron-withdrawing group; the initiator is HCl, H$_2$O or a compound of the formula ROH, wherein R is a hydrocarbyl group capable of forming a stable carbocation and wherein the carbon linking group R to the hydroxyl group is tertiary or benzylic.

The catalyst-initiator system for catalyzing the polymerization of isobutene or an isobutene-containing monomer mixture in a substantially or completely apolar solvent to provide a polybutene product having an exo-olefin content of at least 50 mol. % includes a Lewis acid catalyst complexed with a Lewis base, wherein said Lewis acid catalyst is a Lewis acid of the formula MR"$_m$Y$_n$, wherein M is a metal selected from Al, Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether, wherein each ether hydrocarbyl group is independently selected from C$_1$ to C$_8$ hydrocarbyl, wherein one or each of said ether hydrocarbyl groups are substituted with an electron-withdrawing group; and said initiator is HCl, H$_2$O or a compound of the formula ROH, wherein R is a hydrocarbyl group capable of forming a stable carbocation and wherein the carbon linking group R to the hydroxyl group is tertiary or benzylic, and wherein said initiator is introduced into the reaction mixture separate from, and subsequent to the introduction of, the catalyst complex.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Lewis acid catalysts useful in the practice of the present invention can be represented by the general formula (MR"$_m$Y$_n$), wherein M is selected from Al, Fe, Ga, Hf, Zr and W; preferably Al, Ga or Fe, more preferably Al or Fe; R" is a hydrocarbyl group, preferably a C$_1$ to C$_8$ hydrocarbyl group, more preferably a C$_1$ to C$_8$ alkyl group; m is 0 or an integer of 1 to 5, preferably 0 or 1, more preferably 0; Y is halogen (F, Cl, Br), preferably either Cl or Br, more preferably Cl, and n is an integer of 1 to 6, preferably 3 to 5; with the proviso that m+n is equal to the valency of M. As used herein, the term "hydrocarbyl" means a chemical group of a compound that contains hydrogen and carbon atoms and that is bonded to the remainder of the compound directly via a carbon atom. The group may contain one or more atoms other than carbon and hydrogen ("hetero atoms"), provided they do not affect the essentially hydrocarbyl nature of the group.

The Lewis base (B) is dihydrocarbyl ether, wherein each hydrocarbyl group is independently selected from C$_1$ to C$_8$ hydrocarbyl. The hydrocarbyl groups of the above Lewis bases are preferably alkyl groups. The hydrocarbyl groups of the ether may be branched, straight chained or cyclic. Where the hydrocarbyl groups of the ether are branched or straight chained, the hydrocarbyl groups are preferably alkyl groups, more preferably $C_1$ to $C_4$ alkyl. One or each of the hydrocarbyl groups of the dihydrocarbyl ether Lewis base is substituted with an electron-withdrawing group, particularly a halogen atom, preferably chlorine. Preferably, the ether hydrocarbyl groups are substituted with the electron-withdrawing group on a carbon atom other than the carbon atom adjacent to the oxygen atom of the ether group. Preferred chlorinated dialkyl ethers include 2-chloroethyl ethyl ether, bis-(2-chloroethyl) ether and bis-(2-chloro methyl ethyl) ether.

An "initiator" is defined as a compound that can initiate polymerization, in the presence or absence of adventitious water and in the presence of a proton trap. The initiator of the present invention is HCl, $H_2O$ or a compound of the formula ROH, wherein R is a hydrocarbyl group capable of forming a stable carbocation and wherein the carbon linking group R to the hydroxyl group is tertiary or benzylic. In one preferred embodiment of the invention, the initiator is HCl. In another preferred embodiment of the invention, the initiator is a compound of formula ROH. In yet another preferred embodiment of the invention, the initiator is $H_2O$.

The polymerization medium must be a substantially or completely apolar medium, such as a mixture of hexanes or saturated and unsaturated $C_4$ hydrocarbons.

In the polymerization process of the present invention, the feedstock may be pure isobutylene or a mixed $C_4$ hydrocarbyl feedstock containing isobutylene, such as a $C_4$ cut resulting from the thermal or catalytic cracking operation of, for example, naphtha. Thus, suitable feedstocks will typically contain at least 10%, and up to 100% isobutylene, by mass, based on the total mass of the feed. In addition to isobutylene, conventional $C_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-$C_4$ polymerizable olefin monomers in minor amounts, e.g., typically less than 25%, preferably less than about 10%, and most preferably less than 5%, such as propadiene, propylene and $C_5$ olefins. The $C_4$ cut may be purified by conventional means to remove water, polar impurities and dienes.

The term "polybutene", as employed herein is intended to include not only homopolymers of isobutylene, but also copolymers of isobutylene and one or more other $C_4$ polymerizable monomers of conventional $C_4$ cuts as well as non-$C_4$ ethylenically unsaturated olefin monomers containing 5 carbon atoms, provided such copolymers contain typically at least 50 mass %, preferably at least 65 mass %, and most preferably at least 80 mass % isobutylene units, based on the polymer number average molecular weight (Me).

The Lewis acid and Lewis base can be complexed by, for example, dissolving the Lewis acid in a solvent (e.g., dichloromethane or 1, 2-dichloroethane) to form a solution and then adding the Lewis base to the solution, while the solution is stirred. The complex may be added to the polymerization medium with the solvent; alternatively, the solvent may be removed prior to the addition of the complex to the polymerization medium.

The molar ratio of Lewis acid to Lewis base in the complex will typically be maintained within a range of from about 1:0.5 to about 1:2, preferably from about 1:0.7 to about 1:1.5, more preferably from about 1:0.9 to about 1:1.4, such as from about 1:1 to about 1:1.3.

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of butene and yield of polybutene. In view of the above, the Lewis acid-Lewis base complex is typically employed in an amount sufficient to contact the butene monomer in a liquid phase reaction mixture at a concentration of millimoles of Lewis acid-Lewis base complex per liter of reaction mixture of from about 1 mM to about 200 mM, preferably from about 5 mM to about 100 mM, and more preferably from about 10 mM to about 50 mM, such as from about 10 mM to about 30 mM.

The initiator will typically be employed in an amount sufficient to contact the butene monomer in a liquid phase reaction mixture at a concentration of millimoles of initiator per liter of medium, and independent from the amount of Lewis acid-Lewis base complex, of from about 1 mM to about 200 mM, preferably from about 5 mM to about 100 mM, and more preferably from about 10 mM to about 50 mM, such as from about 10 mM to about 30 mM.

The polymerization reaction can be conducted batchwise, semi-continuously, or continuously. On an industrial scale, the polymerization reaction is preferably conducted continuously. Conventional reactors, such as tubular reactors, tube-bundle reactors or loop reactors, or tube or tube-bundle reactors with continuous circulation of the reaction material, may be used.

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_6$ alkanes, such as propane, butane, pentane or isobutane like.

The Lewis acid-Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator may be introduced to the monomer feed or the reaction mixture in liquid form by a line separate from the Lewis acid-Lewis base complex addition line. In the process of the present invention, the initiator is preferably introduced into the reaction mixture (feedstock) separate from the catalyst complex.

The liquid phase reaction mixture temperature is controlled by conventional means to be typically from about −30° C. to about +50° C., preferably from about −10° C. to about +30° C., more preferably from 0° C. to about +20° C., or from 0° C. to about +10° C.

The residence time of the butene to be polymerized may be from about 5 seconds to several hours, but will typically be from about 1 to about 300 minutes, such as 2 to about 120 minutes, preferably from about 5 to about 60 minutes.

In order to insure even distribution of the catalyst within the reactor, turbulent flow of the reactor contents can be generated by mixing, or with suitable baffles, such as baffle plates or oscillating baffles, or by dimensioning the reactor tube cross sections so that a suitable flow velocity is established. Preferably, the reactor will be constructed such that no surface that contacts the Lewis acid-Lewis base complex is constructed of a material other than stainless steel, as it is believed that contact with stainless steel may cause the partial deactivation of the catalyst.

The process of the present invention is typically conducted in a manner achieving an isobutylene conversion in the range of from about 20% up to about 100%, preferably from about 50% to about 100%, and more preferably from about 70% to about 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol. %, more preferably greater than 70 mol. %, such as from about 80 mol. % to about 95 mol. %; a tetrasubstituted olefin content of less than about 20 mol. %, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol. %, based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

This invention will be further understood by reference to the following examples, which are not intended, and should not be construed as listing all possible embodiments within the scope of the invention.

EXAMPLES

Polymerization

Polymerizations were carried out under a dry nitrogen atmosphere in an MBraun 150-M glove box (Innovative Technology Inc., Newburyport, Mass.) Isobutene (IB) was condensed and distributed to the polymerization reactors, screw top culture tubes (75 ml) at −30° C. Polymerizations were conducted in hexanes initiated with $H_2O$ or HCl and co-initiated with the appropriate ethyl aluminum dichloride ($EtAlCl_2$ or "EADC") concentration with a monomer concentration of 1 M, at 0° C. The initiator was added to the reaction mixture subsequent to the addition of the catalyst complex. After a predetermined time, polymerization was terminated by addition of 0.2 mL methanol. The polymer was recovered and purified by re-precipitation from $NH_4OH$ solution. Conversions were determined by gravimetric analysis.

Preparation of Lewis Acid (La/Ether Complexes)

EADC*bis-(2-chloroethyl) ether (CEE) complexes were prepared at room temperature just before the polymerization of IB. In a glovebox, the required amount of CEE was added to EADC solution in toluene and stirred to form a 1.0 M Lewis acid/CEE complex, followed by dilution with hexanes to make a 0.5 M solution.

Characterization

Number average molecular weights ($\overline{M}_n$) of the polymers were obtained from size exclusion chromatography with universal calibration using a Waters 717 Plus autosampler, a 515 HPLC pump, a 2410 differential refractometer, a 2487 UV-VIS detector, a MiniDawn multi angle laser light scattering (MALLS) detector (measurement angles of 44.7°, 90.0°, and 135.4°) from Wyatt Technology Inc, ViscoStar viscosity detector from Wyatt Technology Inc., and five Ultrastyragel GPC columns connected in the following order: 500, $10^3$, $10^4$, $10^5$ and 100 Å. Refractive index (RI) was the concentration detector. Tetrahydrofuran was used as the eluent at a flow rate of 1.0 ml/min at room temperature. The results were processed by Astra 5.4 software from Wyatt Technology Inc.

Nuclear Magnetic Resonance

Proton nuclear magnetic resonance ($^1H$ NMR) spectra were recorded on a Bruker 500 MHz spectrometer using $CDCl^3$ as solvent (Cambridge Isotope Laboratory, Inc.). The polyisobutene (PIB) end group content was determined by $^1H$ NMR as previously reported (see Kumar, R.; Dimitrov, P.; Bartelson, K. J.; Faust, R., *Macromolecules* 2012, 45, 8598-8603).

Results

TABLE 1

Polymerization of IB in hexanes at 0° C. initiated by $H_2O$ and coinitiated by EADC•CEE. (IB) = 1.0M, ($H_2O$) = 0.01M and (EADC) = 0.01M. Quenched with MeOH.

| Entry # | EADC:CEE ratio | Time (min.) | Conv.[a] (%) | $\overline{M}_n$ NMR g/mol | Exo[b] (%) | Endo + Tri[b] (%) | Tetra[b] (%) |
|---|---|---|---|---|---|---|---|
| 1 | 1:1 | 10 | 34 | 1800 | 77 | 12 | 11 |
| 2 | 1:1 | 20 | 56 | 1540 | 76 | 12 | 12 |
| 3 | 1:1 | 40 | 69 | 1400 | 74 | 13 | 13 |
| 4 | 1:1 | 60 | 86 | 1460 | 74 | 13 | 13 |
| 5 | 1:1.5 | 10 | 27 | 1800 | 80 | 7 | 13 |
| 6 | 1:1.5 | 20 | 47 | 1400 | 83 | 8 | 9 |
| 7 | 1:1.5 | 40 | 71 | 1000 | 81 | 8 | 11 |
| 8 | 1:1.5 | 60 | 78 | 1000 | 83 | 9 | 8 |

[a]Gravimetric conversion.
[b]Determined by $^1H$ NMR spectroscopy.

TABLE 2

Polymerization of IB in hexanes at 0° C. initiated
by HCl and coinitiated by EADC•CEE. (IB) = 1.0M,
(HCl) = 0.01M (EADC) = 0.01M and (CEE) = 0.01M. Quenched with MeOH.

| Entry # | EADC:CEE ratio | Time (min.) | Conv.[a] (%) | $\overline{M}_n$ NMR g/mol | Exo[b] (%) | Endo + Tri[b] (%) | Tetra[b] (%) |
|---|---|---|---|---|---|---|---|
| 9  | 1:1 | 2  | 22 | 2500 | 64 | 15 | 21 |
| 10 | 1:1 | 5  | 25 | 2100 | 63 | 17 | 20 |
| 11 | 1:1 | 10 | 49 | 1800 | 67 | 18 | 15 |
| 12 | 1:1 | 20 | 83 | 1300 | 73 | 15 | 12 |
| 13 | 1:1 | 30 | 85 | 1400 | 72 | 17 | 11 |

[a]Gravimetric conversion.
[b]Determined by $^1$H NMR spectroscopy.

While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A process for the preparation of polybutene having an exo-olefin content of at least 50 mol %, which process comprises contacting isobutene or an isobutene-containing monomer mixture, with a Lewis acid catalyst complexed with a Lewis base, in an apolar polymerization medium, and initiating polymerization of said isobutene or an isobutene-containing monomer mixture with an initiator, wherein said Lewis acid catalyst is a Lewis acid of the formula $MR''_m Y_n$, wherein M is a metal selected from Al, Fe, Ga, Hf, Zr or W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether, wherein each ether hydrocarbyl group is independently selected from $C_1$ to $C_8$ hydrocarbyl, wherein one or each of said ether hydrocarbyl groups are substituted with an electron-withdrawing group; the initiator is HCl, $H_2O$ or a compound of the formula ROH, wherein R is a hydrocarbyl group capable of forming a stable carbocation and wherein the carbon linking group R to the hydroxyl group is tertiary or benzylic.

2. The process of claim 1, wherein M is Al or Fe, and R" is a $C_1$ to $C_8$ alkyl group.

3. The process of claim 1, wherein m is 0 or 1.

4. The process of claim 1, wherein Y is Cl or Br.

5. The process of claim 1, wherein one or each of said ether hydrocarbyl groups are substituted with said electron-withdrawing group on a carbon atom other than the carbon atom adjacent to the oxygen atom of the ether group.

6. The process of claim 1, wherein said ether hydrocarbyl groups are alkyl groups.

7. The process of claim 5, wherein said ether hydrocarbyl groups are $C_1$ to $C_4$ alkyl groups.

8. The process of claim 1, wherein said electron-withdrawing group is a halogen atom.

9. The process of claim 7, wherein said electron-withdrawing group is a chlorine atom.

10. The process of claim 6, wherein said electron-withdrawing group is a halogen atom.

11. The process of claim 10, wherein said electron-withdrawing group is a chlorine atom.

12. The process of claim 1, wherein said apolar polymerization medium is selected from saturated $C_4$ hydrocarbons, unsaturated $C_4$ hydrocarbons, and mixtures thereof.

13. The process of claim 1, wherein said isobutene or an isobutene-containing monomer mixture is selected from pure isobutene; a $C_4$ refinery cut containing between about 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the $C_4$ refinery cut; or mixtures of pure isobutene and said $C_4$ refinery cut.

14. The process of claim 1, wherein said complex is contacted with said isobutene or an isobutene-containing monomer at a concentration of millimoles of Lewis acid-Lewis base complex per liter of medium of from about 1 mM to about 200 mM.

15. The process of claim 1, wherein said Lewis acid and said Lewis base are complexed by dissolving the Lewis acid in solvent to form a solution, and then adding said Lewis base to said solution.

16. The process of claim 1, wherein the polymerization process is conducted continuously.

17. The process of claim 1, wherein said polybutene product has an exo-olefin content of at least 70 mol %.

18. The process of claim 1, wherein said initiator is introduced into the reaction mixture separate from the catalyst complex.

19. A catalyst-initiator system for catalyzing the polymerization of isobutene or an isobutene-containing monomer mixture in a substantially or completely apolar solvent to provide a polybutene product having an exo-olefin content of at least 50 mol. %, wherein said catalyst comprises a Lewis acid catalyst complexed with a Lewis base, wherein said Lewis acid catalyst is a Lewis acid of the formula $M''_m Y_n$, wherein M is a metal selected from Al, Fe, Ga, Hf, Zr or W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether, wherein each ether hydrocarbyl group is independently selected from $C_1$ to $C_8$ hydrocarbyl, wherein one or each of said ether hydrocarbyl groups are substituted with an electron-withdrawing group; and the polymerization is initiated via an initiator, wherein the initiator is HCl, $H_2O$ or a compound of the formula ROH, wherein R is a hydrocarbyl group capable of forming a stable carbocation and wherein the carbon linking group R to the hydroxyl group is tertiary or benzylic, and wherein said initiator is introduced into the reaction mixture separate from, and subsequent to the introduction of, the catalyst complex.

20. The catalyst-initiator system of claim 19, wherein M is Al or Fe, and R" is a $C_1$ to $C_8$ alkyl group.

21. The catalyst-initiator system of claim 19, wherein m is 0 or 1.

22. The catalyst-initiator system of claim 19, wherein Y is Cl or Br.

23. The catalyst-initiator system of claim 19, wherein one or each of said ether hydrocarbyl groups are substituted with said electron-withdrawing group on a carbon atom other than the carbon atom adjacent to the oxygen atom of the ether group.

24. The catalyst-initiator system of claim 19, wherein said ether hydrocarbyl groups are alkyl groups.

25. The catalyst-initiator system of claim 23, wherein said ether hydrocarbyl groups are $C_1$ to $C_4$ alkyl groups.

26. The catalyst-initiator system of claim 19, wherein said electron-withdrawing group is a halogen atom.

27. The catalyst-initiator system of claim 25, wherein said electron-withdrawing group is a chlorine atom.

28. The catalyst-initiator system of claim 23, wherein said electron-withdrawing group is a halogen atom.

29. The catalyst-initiator system of claim 27, wherein said electron-withdrawing group is a chlorine atom.

30. The catalyst-initiator system of claim 19, wherein said Lewis acid and said Lewis base are complexed by dissolving the Lewis acid in solvent to form a solution, and then adding said Lewis base to said solution.

31. The catalyst-initiator system of claim 19, wherein said initiator is introduced into the reaction mixture separate from the catalyst complex.

* * * * *

UNITED STATES PATENT AND TRADEMARK OFFICE
CERTIFICATE OF CORRECTION

PATENT NO. : 9,771,442 B2
APPLICATION NO. : 14/710763
DATED : September 26, 2017
INVENTOR(S) : Rudolf Faust and Jacob Emert Page 1 of 1

It is certified that error appears in the above-identified patent and that said Letters Patent is hereby corrected as shown below:

In the Claims

In Claim 19, Column 11, Line 3, delete "$M"_m Y_n$" and insert -- $MR"_m Y_n$ --

Signed and Sealed this
Twenty-third Day of April, 2019

Andrei Iancu
*Director of the United States Patent and Trademark Office*